Aug. 6, 1968          A. W. MOSS          3,395,475
ELECTRICAL ILLUMINATION DEVICES
Original Filed Feb. 3, 1964          6 Sheets-Sheet 1
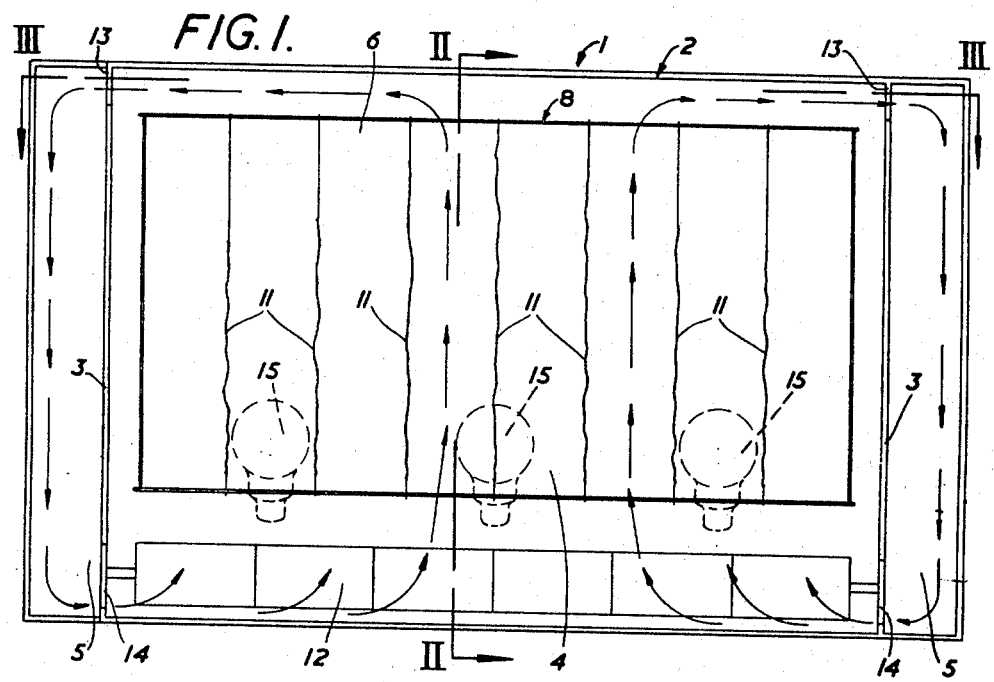
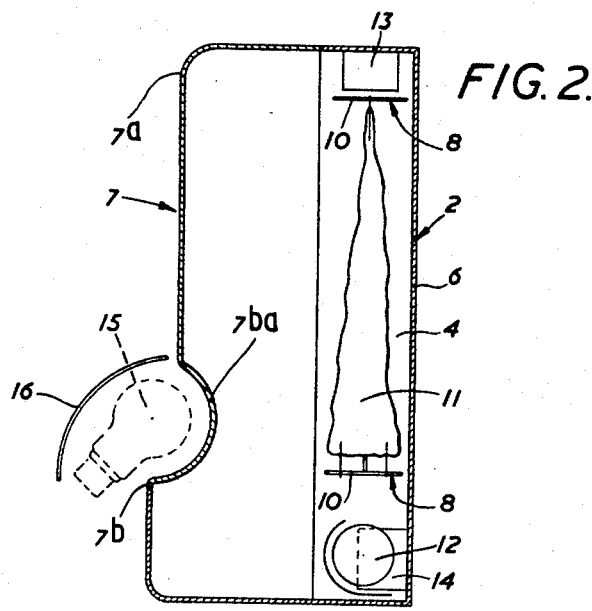
Inventor
Arthur William Moss
By Inventor
Arthur William Moss
By Aug. 6, 1968  A. W. MOSS  3,395,475
ELECTRICAL ILLUMINATION DEVICES
Original Filed Feb. 3, 1964  6 Sheets-Sheet 4
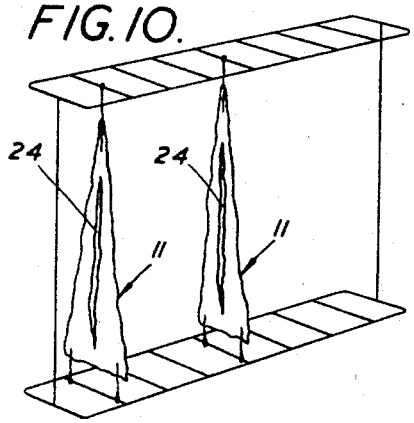
FIG. 10.
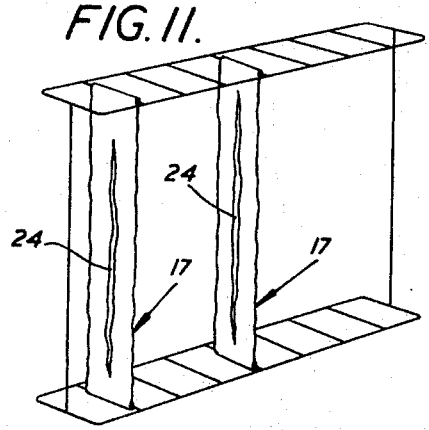
FIG. 11.
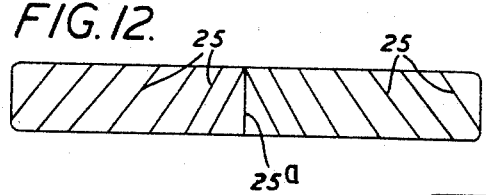
FIG. 12.
FIG. 13.
FIG. 14.
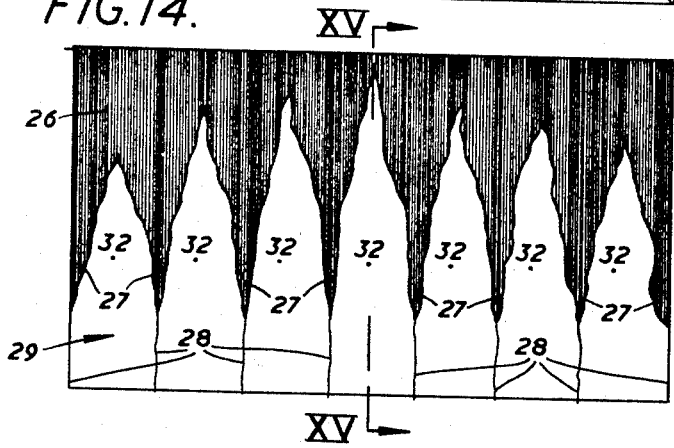
FIG. 15.
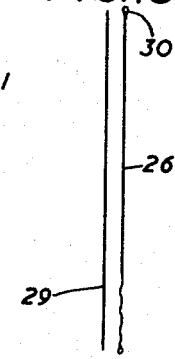
Inventor
Arthur William Moss
By
[signature]

Aug. 6, 1968 — A. W. MOSS — 3,395,475
ELECTRICAL ILLUMINATION DEVICES
Original Filed Feb. 3, 1964 — 6 Sheets-Sheet 5
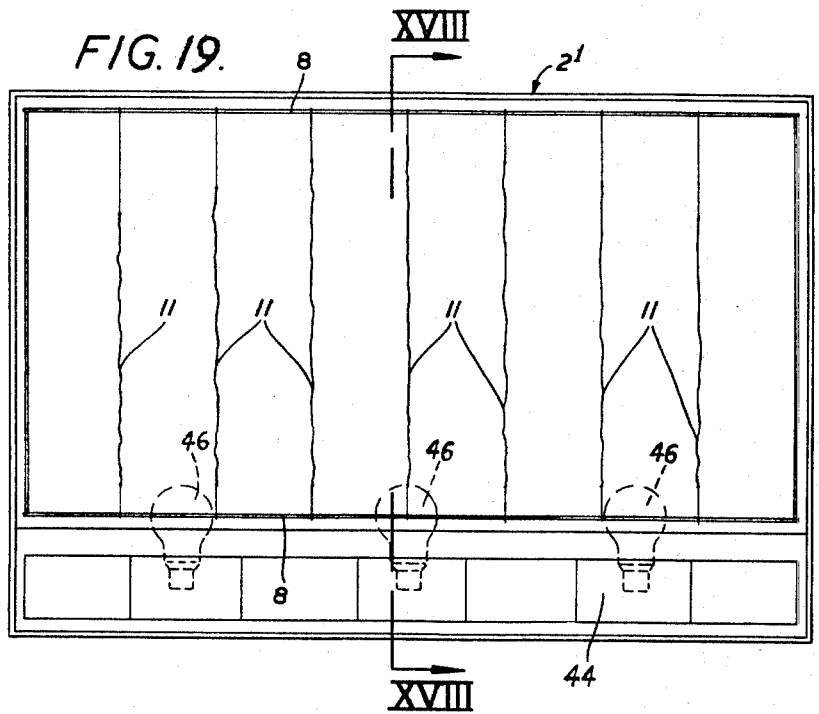
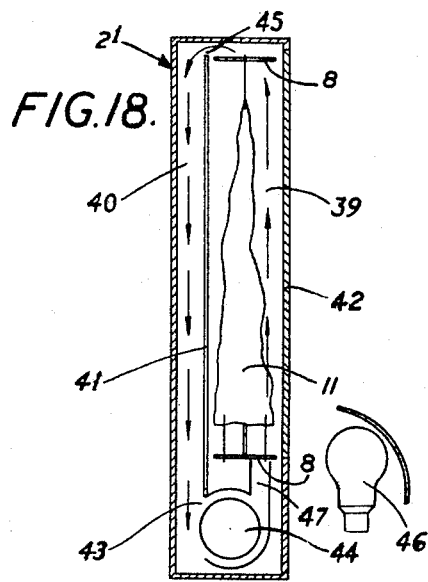
Inventor
Arthur William Moss
By
Walter Becker Inventor
Arthur William Moss
By United States Patent Office 3,395,475
Patented Aug. 6, 1968

3,395,475
ELECTRICAL ILLUMINATION DEVICES
Arthur William Moss, Walsall, England, assignor to
H. Frost & Company Limited, Walsall, England, a
British company
Continuation of application Ser. No. 342,050, Feb. 3,
1964. This application Mar. 7, 1967, Ser. No. 621,356
3 Claims. (Cl. 40—106.54)

ABSTRACT OF THE DISCLOSURE

A flame simulating illumination device is composed of vertically extending reflecting surfaces spaced by nonreflecting surfaces on a loosely suspended curtain, which is illuminated by a source of flickering light and agitated by air currents produced by a fan. The reflecting surfaces are viewed through a translucent screen to produce the effect of tongues of flame.

---

This application is a continuation of Ser. No. 342,050, filed Feb. 3, 1964, now abandoned.

This invention relates to electrical illumination devices. Devices, in accordance with the present invention can be arranged to be embodied, for example, in heaters, such as in electric fires of the imitation solid-fuel type, or can be constructed to be used on their own as display appliances.

An object of the invention is to provide an electrical illumination device with means for varying the lighting effect imparted by the device.

FIGURE 1 of the accompanying drawings shows, by way of example, and in front elevation, an electrical illumination device constructed in accordance with the present invention.

FIGURES 2 and 3 are sections on the lines II—II, FIGURE 1, and III—III, FIGURE 1, respectively.

FIGURES 4 to 11 illustrate various forms and arrangements of flexible strips which can be used in devices in accordance with the present invention.

FIGURES 12 and 13 illustrate two different modified forms of framework which can be used in conjunction with the various forms of strips shown in FIGURES 4 to 11.

FIGURES 14 and 15 illustrate a modification, FIGURE 15 being a section on the line XV—XV, FIGURE 14.

FIGURES 18 and 19 show a modified construction in which air is circulated in a manner different from that shown in FIGURE 1, FIGURE 18 being a section on the line XVIII—XVIII, FIGURE 19.

Figure 3:
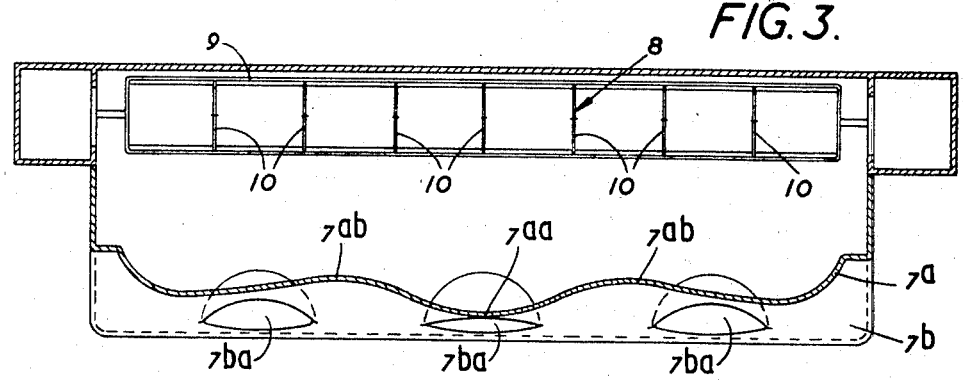

Referring to FIGURES 1 to 4 of the drawings, an electrical illumination device 1 comprises an air-tight metal casing 2 of oblong form in front view, and the interior of which is divided by vertical partitions 3 into a central main compartment 4, and two side compartments or ducts 5. The main compartment 4 has its back wall, shown at 6, blackened over the whole of its front face, and the front of said compartment 4 is closed by a translucent viewing screen 7, the main upper part 7a of which is of horizontally-curved undulating form, said screen upper part 7a having, viewed in horizontal cross-section, a central forwardly-presented convex portion 7aa flanked at opposite sides by forwardly-presented concave portions 7ab. The said screen upper part 7a consists of a panel having thereon a light-diffusing surface formed by abrading on the panel, in a manner described in the specification of U.S. application Ser. No. 341,894, filed Feb. 3, 1964, a multiplicity of closely-adjacent thin, horizontal or near-horizontal, broken or unbroken lines (not shown) extending from one side to the other of the panel. Mounted in the main compartment 4, and extending laterally of the translucent viewing screen 7, is a pair of upper and lower wire frameworks 8, which in plan are of a ladder formation in appearance, said frameworks each consisting of an elongated rectangular outer frame 9 bridged intermediate its ends by a plurality of parallel wire cross-bars 10 extending forwardly of, and at right angles to, the back wall of the compartment 4.

Figure 4:
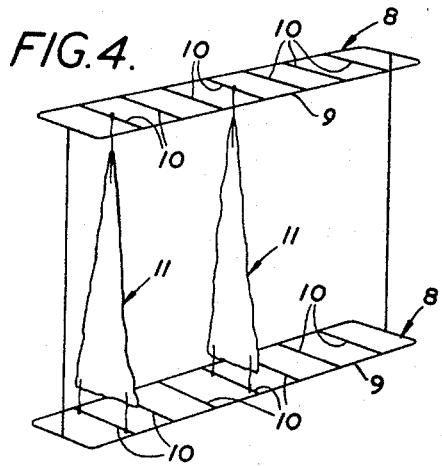

Housed within the compartment 4, and anchored or tethered at top and bottom as shown to respective cross-bars 10 of the frameworks 8, are a plurality of separate hanging flexible strips 11 of a flame-coloured material (for example satin nylon material), each strip 11 being of elongated three cornered upwardly-tapering flame shape, and both side faces of the strip constituting highly-reflective surfaces. Each strip 11 is mounted so that when stationary it is presented edgewise to the screen, 7, and is attached to the respective cross-bar 10 by filamentous material (for example nylon strands) extending from the three corner portions of said strip, as shown in FIGURE 4.

Disposed beneath the strips 11 and extending along the bottom of the main compartment 4, is a bladed rotary fan 12 driven by a suitable electric motor (not shown), the said fan being operable to produce an upwardly-ascending air flow past the flexible strips 11. The side compartments or ducts 5 each have upper and lower ports 13, 14 opening into the main compartment 4. The device 1 carries, outside the casing 2, electric lamps 15 for illuminating the flexible strips 11 with red or orange light, said lamps being concealed from front view by a suitable shield such as 16 (FIGURE 2), and being arranged for illuminating the strips 11 through a lower portion 7b of the screen 7, said lower portion 7b having therein recesses 7ba accommodating portions of the lamps 15 as shown.

In order to operate the device 1, the lamps 15 and the fan motor are switched on, whereupon the fan 12 rotates and causes air to circulate in the closed casing 2 in the manner shown by the flow arrows in FIGURE 1, said air flowing up past the strips 11, and returning to the fan by flowing through the ports 13, compartment or ducts 5, and ports 14, some of the air passing down through the one compartment or duct 5 and the remainder of the air passing down through the other compartment or duct 5, as indicated. This air flow from the fan 12 causes the anchored or tethered flexible strips 11 illuminated by the lamps 15 to move with a fluttering motion, and the consequent variation in the lighting effect is such that, to a person viewing the illuminated strips 11 through the screen 7, the strips 11 simulate upwardly-shooting flickering flames.

Conveniently, the strips 11 have their side edges reinforced by latex, or welded (if of suitable material), to prevent overdue fraying.

Figure 5:
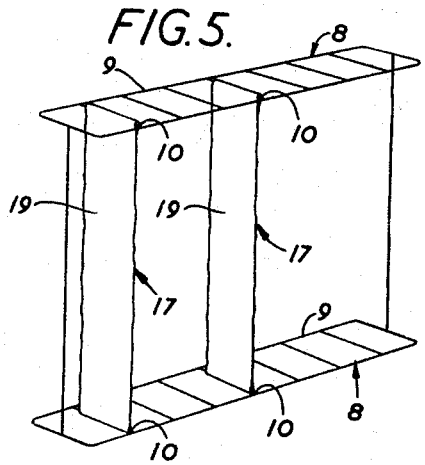

If desired, instead of the tethered or enclosed flexible strips being of upwardly-tapering flame-shaped form, they may be rectangular strips 17 of light-deflecting material, as illustrated in FIGURE 5. The said strips 17 are shown provided at top and bottom with sleeves engaged with the respective cross-bars 10. Conveniently, these sleeves are formed before the strips 17 are attached to the bars 10, and the said bars 10 can each be attached at one end only to the respective outer frame 9, the other ends of the bars 10 being left free to be sprung up from the respective frames 9 when it is desired to attach the sleeved ends of the strips 17 in place. The strips 17 may have selvedge on their edges to prevent or reduce fraying, or may have their edges reinforced by suitable adhesive or (if of suitable material) by welding. The strips 17 may have their longitudinal edge portions blackened by a suitable dye, as shown at 18, FIGURE 6.

Figure 6:
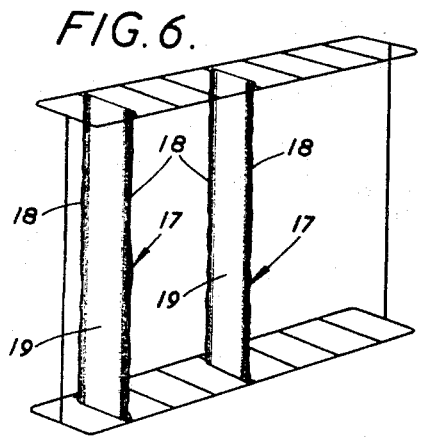
Figure 7:
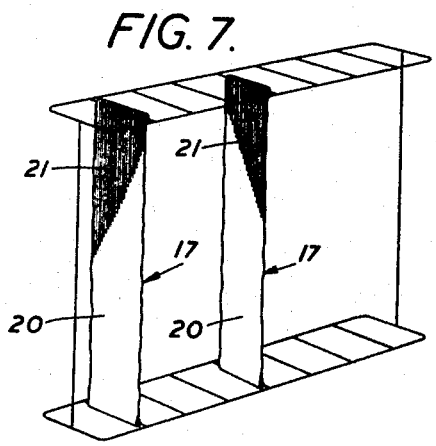
Figure 8:
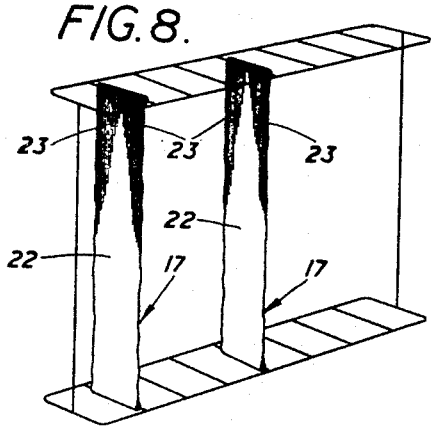

The strips 17 shown in FIGURES 5 and 6 each have on each face a rectangular light-reflecting area 19 extending for the entire length of the strip, but in the modifications illustrated in FIGURES 7 and 8 each rectangular strip 17 has an upwardly-tapering light-reflecting area on each face. In FIGURE 7, each strip 17 has on each side a light-reflecting area 20 which tapers upwardly at the top towards one longitudinal edge of the strip, and has a complementary downwardly-tapering nonreflecting blackened area 21 disposed above the reflecting areas 20. In FIGURE 8, each face of each strip 17 has a light-reflecting area 22 which tapers upwardly in a symmetrical fashion towards the middle of the top edge of the strip, and has a pair of downwardly tapering nonreflecting blackened areas 23 collectively complementary to the reflecting area 22.

Figure 9:
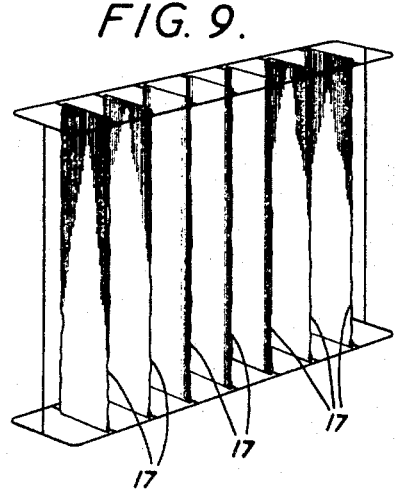

A preferred arrangement, in the case where rectangular strips 17 are employed, is for the strips to be arranged in three groups, namely a central group of strips 17 each of the form shown in FIGURE 5, or in FIGURE 6, and two outer groups of strips 17 each of the form shown in FIGURE 7, or in FIGURE 8, whereby there is provided a central group of strips having elongated rectangular light-reflecting areas, and two outer groups of strips which flank the central group of strips at opposite sides and have upwardly-tapering light-reflecting areas. An example of this arrangement is illustrated in FIGURE 9, which shows a central group of strips 17, each of the form shown in FIGURE 6, flanked by two outer groups of strips 17 each of the form shown in FIGURE 8. If desired, the said outer groups could be flame-shaped strips of the form shown in FIGURE 4.

The flame-shaped strips 11 shown in FIGURE 4, and the rectangular strips 17 shown in FIGURES 5 to 9, may, with a view to enhancing the lighting effect when the device is in operation, be modified by removing thin laminae of material therefrom to leave each strip with a narrow central slot 24 therein, as illustrated in FIGURES 10 and 11 which respectively show flame-shaped strips 11 and rectangular strips 17 provided with the said slots 24. Or, each strip 11 or 17 may have therein a plurality of narrow vertical slots of varying lengths.

It is convenient, in the particular arrangements shown in FIGURES 4 to 11, that the number of strips 11 or 17 should be such that each cross-bar 10 has one end of a respective strip anchored or tethered to it, as in the case of FIGURE 9, but in order to simplify the drawings only two of the strips are shown in each of FIGURES 4 to 8 and 10 and 11.

If desired, instead of strips 11 or 17 being anchored or tethered at top and bottom to parallel cross-bars 10, they may be anchored or tethered at top and bottom to obliquely-disposed horizontal bars 25 of respective top and bottom frameworks each of the form shown in FIGURE 12, or of the form shown in FIGURE 13. In FIGURE 12, all the oblique bars 25 at one side of the center-line of the frame-work slope forward in one direction, while all the bars 25 at the other side of the said center-line slope forward in an opposite direction. The framework shown in FIGURE 12 can in addition have a central cross-bar 25a set at right-angles to the length of the framework, if required. In FIGURE 13, alternate oblique bars 25 slope forward in one direction, while the remaining oblique bars 25 slope forward in an opposite direction.

While it is preferred to tether or anchor the strips 11 or 17 at both top and bottom, if required the said strips can be left unattached at their bottom ends, and the said unattached ends of the strips can be suitably weighted.

FIGURES 14 and 15, and 16 and 17, illustrate two modified forms of flexible material which can be substituted, in the device, shown in FIGURE 1, for the flexible strips. In FIGURES 14 and 15, the flexible material is in the form of a flexible suspended sheet of black cloth 26 cut out to form it with a group of depending tongues 27, each tongue 27 being anchored at the bottom by a nylon strand 28. This sheet 26 is disposed in front of, and partly masks, a forwardly-presented light-reflecting surface 29 in the form of a silvered drape attached to the back wall of the casing of the device 1. The sheet 26 is anchored at the top, for example, by forming the sheet 26 with an integral attachment sleeve 30 which is engaged over a suitable support rail 31; and the group of depending tongues 27 is, as shown, of a shape complementary to that of a group of upwardly-extending tongues of flame, whereby when the device is viewed from the front, unmasked portions 32 of the rear reflecting surface 29 simulate the appearance of tongues of flame. The movement of the sheet 26, when the device is in operation and air is blown upwards over the said sheet by the fan, causes movement of the back cloth tongues 27, thereby causing variation of the shape, as viewed from the front, of the unmasked portions 32 of the reflecting surface 29, so that a flickering or varying light effect is thus obtained. If desired the tongues 27 can be weighted and left free at the bottom, instead of being tethered by the strands 28.

Figure 16:
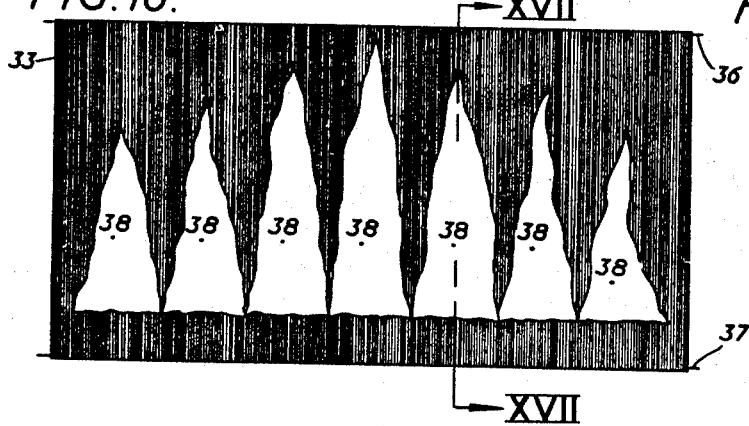
FIGURES 16 and 17 illustrate a further modification, FIGURE 17 being a section on the line XVII—XVII, FIGURE 16.
Figure 17:
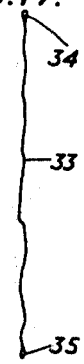

In FIGURES 16 and 17, the flexible material is in the form of a black flexible sheet 33 which is anchored at top and bottom, such as by forming it with top and bottom attachment sleeves 34, 35 engaged over top and bottom anchorage rails, 36, 37 and the front of which has attached thereupon such as by stitching, flame-shaped fabric strips 38 of light-reflecting material, the sheet 33 bearing the strips 38 being caused, when the device is in operation, to be moved up and down by the air from the fan to give a flickering or varying light effect. If desired, flame-shaped reflecting areas can be painted directly on the front of the sheet 33, instead of providing the strips 38.

FIGURES 18 and 19 illustrate a modified arrangement for circulating air for moving the flexible material. In the said FIGURES 18 and 19, the device has an air-tight metal casing 2' of oblong box form which, instead of being divided into central and side compartments, as in FIGURE 1, is divided into front and rear compartments, shown at 39, 40 respectively, by a vertical rectangular metal or plastic partition 41 extending for the entire length of the interior of the casing 2'. The casing is closed at the front by a translucent viewing screen 42, and extending along the bottom wall of the casing, in a space 43 below the partition 41, is a rotary fan 44 driven by a suitable motor (not shown). A space 45 is left between the top edge of the partition 41 and the top wall of the casing, the compartments 39, 40 thereby communicating with each other at the top through said space 45. The bottom space 43 communicates with the compartments 39 through a duct 47. Suspended flexible material, which in the particular construction shown, is in the form of flame-shaped light-reflecting strips 11 tethered or anchored at top and bottom to frameworks 8 in accordance with FIGURE 4, and disposed in the front compartment 39, behind the screen 42; and suitable lamp means 46 is provided, outside the casing, for the purpose of illuminating the strips 11 from the front. When the device is in operation, with the lamp means and fan switched on, air flows, from the fan 44, upwardly through the duct 47 to the front compartment 39 past the flexible strips 11 and, after entering the rear compartment 40, through the space 45, flows downwardly through the said rear compartment 40 and then returns to the fan, the direction of flow being indicated by the arrows shown in FIGURE 18. The resultant movement of the strips 11, as viewed through the screen causes the effect of upwardly-shooting flames to be imparted to the viewer. In this embodiment each strip 11 is, in the manner indicated by FIGURE 18, mounted asymmetrically with respect to the duct 47, so that only part of each strip 11 is subject to the full force of the air flow.

If desired, instead of being constructed and arranged according to FIGURE 4, the flexible material in the compartment 39 may be strips constructed and arranged according to any one of FIGURES 5 to 11, or may be constructed and arranged in accordance with FIGURES 14 and 15, or 16 and 17.

If desired, the arrangement shown in FIGURES 18 and 19 can be modified by providing, in place of the viewing screen 42 and lamp means 46, a viewing screen and lamp means constructed and arranged similarly to the screen 7 and lamps 15 shown in FIGURES 2 and 3, with portions of the lamps accommodated within recesses, similar to the recesses 7ba, in the lower portion of the viewing screen.

While it is preferred that the casing 2 be air-tight, the said casing can, if desired be of a construction which is not air-tight.

Furthermore, while it is preferred that the viewing screen consist of a panel having thereon a multiplicity of closely-adjacent thin horizontal or near-horizontal broken or unbroken lines, and be of a horizontally-curved undulating form having a central forwardly-presented convex portion flanked by concave portions, as hereinbefore described in the case of the screen 7, if desired the viewing screen may be of any other suitable construction or shape.

It is not essential for the interior of the casing to be physically divided by vertical partitions, and if desired said partitions may be omitted.

In a modification (not shown) of the arrangement shown in FIGURES 18 and 19, the strips 11 are placed in the rear portion of the casing 2' and the partition 41 is omitted. In this modification the fan is arranged so that when in operation it causes the air in the casing 2' to flow upwardly in the rear portion of the interior of the said casing 2', past the strips 11, and then to return downwardly through the front portion of the interior of the casing 2'.

Figure 20:
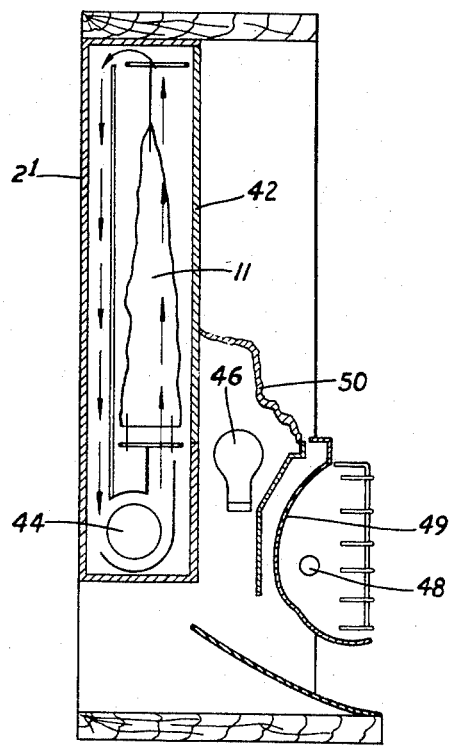
FIGURE 20 shows an electric fire embodying the device shown in FIGURES 18 and 19.

The illumination device can if desired be embodied in a heater, for example in an electric fire of the imitation solid fuel type. By way of example, FIGURE 20 illustrates an electric fire having embodied therein the device shown in FIGURES 18 and 19, the said fire being provided with a heating element 48, radiant-heat reflector 49 and imitation fuel 50. In this particular arrangement, the lamps 46 serve to illuminate the imitation fuel 50 as well as illuminating the strips 11, and the said imitation fuel 50 serves to conceal the lamps 16 from direct view.

I claim:

1. An electrical illumination device comprising: a casing having a translucent viewing screen, a forwardly presented light-reflecting surface arranged in said casing behind said screen, a suspended flexible continuous sheet disposed in said casing behind said translucent screen in front of said light-reflecting surface, said flexible sheet extending substantially across the width of said screen having a group of downwardly tapering tongue-shaped nonreflecting areas complementary in shape to a group of upwardly extending tongues of flame, said nonreflecting areas extending from the vicinity of one side edge of said sheet to the vicinity of the other side edge of said sheet, lamp means operable to illuminate said light-reflecting surface, whereby light from said lamp means is reflected through said translucent screen by those portions of said reflecting surface which are unmasked by said sheet, and air-moving means operable to produce air movement causing the flexible sheet to move, whereby to a person viewing the said sheet through said screen the movement of said sheet gives a moving light effect over a substantial area of said screen.

2. An electrical illumination device comprising: a casing having a translucent viewing screen, a forwardly presented light-reflecting surface arranged in said casing behind said screen, a suspended flexible continuous sheet disposed in said casing behind said translucent screen in front of said light-reflecting surface, said flexible sheet extending substantially across the width of said screen and having a group of downwardly tapering tongue-shaped nonreflecting areas complementary in shape to a group of upwardly extending tongues of flame, said nonreflecting areas extending from the vicinity of one side edge of said sheet to the vicinity of the other side edge of said sheet while each of said downwardly tapering areas is tethered at the bottom, lamp means operable to illuminate said light-reflecting surface, whereby light from said lamp means is reflected through said translucent screen by those portions of said reflecting surface which are unmasked by said sheet, and air-moving means operable to produce air movement causing the flexible sheet to move, whereby to a person viewing the said sheet through said screen the movement of said sheet gives a moving light effect over a substantial area of said screen.

3. An electrical illumination device comprising: a casing having a translucent viewing screen; a flexible sheet which hangs slackly and limply when at rest and which has continuous top and bottom portions, vertical, forwardly presented, spaced, light-reflecting surfaces of upwardly tapering flame shape between said top and bottom portions and forwardly presented downwardly tapering nonreflecting surfaces which are complementary to and extend between said light-reflecting surfaces; means extending across the width of said screen to suspend said sheet from said top portion, said flame-shaped light-reflecting surfaces being provided from the vicinity of one side edge of the sheet to the vicinity of the other side edge of the sheet; lamp means operable to illuminate said light-reflecting surfaces, whereby light from the lamp means is reflected by said reflecting surfaces through said translucent screen; and air-moving means operable to produce air movement causing the flexible sheet, with its light-reflecting surfaces, to move, whereby to a person viewing the said sheet through the said screen, the movement of the light-reflecing surfaces gives a moving light effect over a substantial area of the said screen.

References Cited
UNITED STATES PATENTS

| | | | |
|---|---|---|---|
| 662,708 | 11/1900 | Carter | 272—15 |
| 2,285,535 | 6/1942 | Schlett | 240—10 X |

EUGENE R. CAPOZIO, *Primary Examiner.*

R. CARTER, *Assistant Examiner.*